(12) United States Patent
Spiller

(10) Patent No.: US 9,635,902 B2
(45) Date of Patent: May 2, 2017

(54) SAFETY FOOTWEAR

(71) Applicant: TBL Licensing LLC, Wilmington, DE (US)

(72) Inventor: Bert Appleton Spiller, Dover, NH (US)

(73) Assignee: TBL Licensing LLC, Stratham, NH (US)

( * ) Notice: Subject to any disclaimer, the term of this patent is extended or adjusted under 35 U.S.C. 154(b) by 0 days.

(21) Appl. No.: 14/208,037

(22) Filed: Mar. 13, 2014

(65) Prior Publication Data

US 2014/0259768 A1  Sep. 18, 2014

Related U.S. Application Data

(60) Provisional application No. 61/779,054, filed on Mar. 13, 2013.

(51) Int. Cl.
*A43B 1/04* (2006.01)
*A43B 1/08* (2006.01)
*A43B 5/00* (2006.01)
*A43B 7/14* (2006.01)
*A43B 7/26* (2006.01)
*A43B 13/22* (2006.01)
*A43B 23/00* (2006.01)
(Continued)

(52) U.S. Cl.
CPC .................. *A43B 7/32* (2013.01); *A43B 1/08* (2013.01); *A43B 3/24* (2013.01); *A43B 3/242* (2013.01); *A43B 7/26* (2013.01); *A43B 13/41* (2013.01); *A43B 23/081* (2013.01); *A43B 23/088* (2013.01)

(58) Field of Classification Search
CPC .... A43B 1/08; A43B 7/26; A43B 7/32; A43B 13/41; A43B 23/081; A43B 23/088
USPC .................... 36/83, 85, 87, 94, 96, 107, 108
See application file for complete search history.

(56) References Cited

U.S. PATENT DOCUMENTS 247,136 A    9/1881  Vermilye
404,449 A    6/1889  Vail
(Continued)

FOREIGN PATENT DOCUMENTS

EP    2446765 A1    5/2012
GB    2264221 A     8/1993
(Continued)

OTHER PUBLICATIONS

International Search Report and Written Opinion for Application No. PCT/US2014/025916 dated Jul. 24, 2014.
(Continued)

*Primary Examiner* — Anna Kinsaul
*Assistant Examiner* — Cameron A Carter
(74) *Attorney, Agent, or Firm* — Lerner, David, Littenberg, Krumholz & Mentlik, LLP

(57) ABSTRACT

A footwear system is disclosed, which includes a shell having an inner cavity and at least one recessed area offset from an inner surface of the shell, and a chassis having one or more components adapted to protect a user's foot from injury. In one embodiment, the chassis is insertable into the inner cavity of the shell, such that the one or more components of the chassis are securely retained (e.g., permanently affixed) within the at least one recessed area of the shell. Methods of forming the aforementioned footwear system using expandable materials are also disclosed.

16 Claims, 14 Drawing Sheets

(51) Int. Cl.
*A43B 23/08* (2006.01)
*A43B 7/32* (2006.01)
*A43B 3/24* (2006.01)
*A43B 13/41* (2006.01)

(56) References Cited

U.S. PATENT DOCUMENTS

| | | | |
|---|---|---|---|
| 553,130 A | 1/1896 | Norris | |
| 582,961 A | 5/1897 | Shoop | |
| 913,695 A | 3/1909 | Carroll | |
| 1,042,870 A | 10/1912 | Benninghaus | |
| 1,478,467 A | 12/1923 | Binns | |
| 1,749,789 A | 3/1930 | Wheeler | |
| 1,750,397 A | 3/1930 | Faulstich | |
| 1,851,629 A | 3/1932 | Herzstein | |
| RE22,614 E | 3/1945 | Roberts | |
| 2,427,459 A | 9/1947 | Jastrzomb | |
| 3,419,974 A | 1/1969 | Lange | |
| 3,514,877 A | 6/1970 | Coppola | |
| 3,531,878 A | 10/1970 | Corry | |
| 3,621,489 A | 11/1971 | Keller | |
| 3,645,017 A * | 2/1972 | Hickmann | A43B 5/0427 |
| | | | 36/117.4 |
| 3,718,994 A * | 3/1973 | Spier | A43B 3/0084 |
| | | | 36/117.1 |
| 3,783,534 A | 1/1974 | Phillips et al. | |
| 3,827,167 A | 8/1974 | Jones | |
| 4,062,133 A | 12/1977 | McGee et al. | |
| 4,329,790 A | 5/1982 | Bell | |
| 4,385,456 A | 5/1983 | Livernois et al. | |
| 4,563,825 A | 1/1986 | Tesser et al. | |
| 4,586,271 A | 5/1986 | Maleyko et al. | |
| 4,587,749 A | 5/1986 | Berlese et al. | |
| 4,607,440 A | 8/1986 | Roberts et al. | |
| 4,640,027 A | 2/1987 | Berlese et al. | |
| 4,641,438 A | 2/1987 | Laird et al. | |
| 4,693,021 A | 9/1987 | Mazzarolo et al. | |
| 4,724,623 A | 2/1988 | Silverman | |
| 4,747,221 A * | 5/1988 | Hayes | A43B 5/04 |
| | | | 36/117.4 |
| 4,864,742 A | 9/1989 | Grilliot et al. | |
| 4,949,479 A * | 8/1990 | Ottieri | A43B 5/0435 |
| | | | 36/117.1 |
| 5,007,111 A | 4/1991 | Adams et al. | |
| 5,068,982 A | 12/1991 | Devasthal | |
| 5,117,568 A | 6/1992 | Mitsui | |
| 5,148,565 A | 9/1992 | Devasthali | |
| 5,163,238 A * | 11/1992 | Demarchi | A43B 5/048 |
| | | | 36/117.7 |
| 5,317,821 A | 6/1994 | Vargo | |
| 5,324,219 A * | 6/1994 | Beltrani | A63B 31/11 |
| | | | 441/64 |
| 5,438,769 A | 8/1995 | Mazzarolo et al. | |
| 5,546,680 A * | 8/1996 | Barma | A43B 13/14 |
| | | | 36/108 |
| 5,855,079 A | 1/1999 | Herbert et al. | |
| 5,933,985 A | 8/1999 | James | |
| 5,987,778 A | 11/1999 | Stoner | |
| 5,996,257 A * | 12/1999 | Harrison | A43B 7/32 |
| | | | 36/107 |
| 6,000,148 A * | 12/1999 | Cretinon | A43B 5/00 |
| | | | 36/69 |
| 6,066,384 A | 5/2000 | Crandall | |
| 6,178,664 B1 * | 1/2001 | Yant | A43B 7/32 |
| | | | 36/107 |
| 6,237,254 B1 | 5/2001 | Rork et al. | |
| 6,324,773 B1 | 12/2001 | Gaither | |
| 6,360,454 B1 | 3/2002 | Dachgruber et al. | |
| 6,408,542 B1 | 6/2002 | Shepherd | |
| 6,427,362 B2 | 8/2002 | Rork et al. | |
| 6,442,873 B2 | 9/2002 | Rork et al. | |
| 6,519,876 B1 * | 2/2003 | Geer | A43B 1/0081 |
| | | | 36/102 |
| 6,560,898 B2 | 5/2003 | Borsoi et al. | |
| 6,604,303 B2 * | 8/2003 | Covatch | A43B 7/32 |
| | | | 12/146 D |
| 7,007,411 B2 * | 3/2006 | Davis | A43B 7/12 |
| | | | 36/107 |
| 7,441,351 B2 | 10/2008 | Clark et al. | |
| 7,578,076 B2 * | 8/2009 | Pawlus | A43B 3/0047 |
| | | | 36/100 |
| 9,173,448 B1 * | 11/2015 | Knoblauch | A43B 5/00 |
| 2001/0032398 A1 * | 10/2001 | Maritz | A43B 7/32 |
| | | | 36/72 R |
| 2002/0092201 A1 * | 7/2002 | Kraeuter | A43B 5/00 |
| | | | 36/25 R |
| 2002/0129517 A1 * | 9/2002 | Diaz | A43B 7/32 |
| | | | 36/72 R |
| 2002/0144435 A1 | 10/2002 | Shepherd | |
| 2002/0170205 A1 | 11/2002 | Shepherd | |
| 2004/0045196 A1 | 3/2004 | Shepherd | |
| 2004/0226195 A1 | 11/2004 | Martinez | |
| 2004/0237178 A1 | 12/2004 | Landeros | |
| 2004/0255486 A1 * | 12/2004 | Pawlus | A43B 3/0047 |
| | | | 36/10 |
| 2005/0217147 A1 | 10/2005 | Dion | |
| 2007/0000150 A1 * | 1/2007 | Covatch | A43B 23/081 |
| | | | 36/10 |
| 2009/0178302 A1 * | 7/2009 | Kim | A43B 7/081 |
| | | | 36/107 |
| 2009/0300942 A1 * | 12/2009 | Peikert | A43B 1/0045 |
| | | | 36/88 |
| 2011/0126424 A1 * | 6/2011 | Gobbato | A43B 13/10 |
| | | | 36/43 |
| 2012/0260533 A1 * | 10/2012 | Nenow | A43B 3/0036 |
| | | | 36/103 |
| 2012/0266492 A1 * | 10/2012 | Youngs | A43B 7/34 |
| | | | 36/83 |
| 2012/0285041 A1 * | 11/2012 | Klein | A43B 3/24 |
| | | | 36/83 |
| 2012/0291309 A1 * | 11/2012 | Ludemann | A43B 7/144 |
| | | | 36/83 |
| 2012/0304495 A1 * | 12/2012 | Brabson | A43B 7/12 |
| | | | 36/87 |

FOREIGN PATENT DOCUMENTS

| | | |
|---|---|---|
| WO | WO 9005466 A1 * | 5/1990 |
| WO | 2015020304 A1 | 2/2015 |
| WO | 2016047154 A1 | 3/2016 |

OTHER PUBLICATIONS

Supplementary European Search Report for Application No. 14774295.1 dated Oct. 13, 2016.
"Ladder Company Operations: Portable Ladders" © FDNY Firefighting Procedures; vol. 3, Book 1, Revised Mar. 15, 1997; 1986 New York City Fire Department.
www.metadesign.it/lenzi/adv_lenzi_04.htm, advertising K-Systems®; retrieved from the Internet Jun. 24, 2005.

* cited by examiner

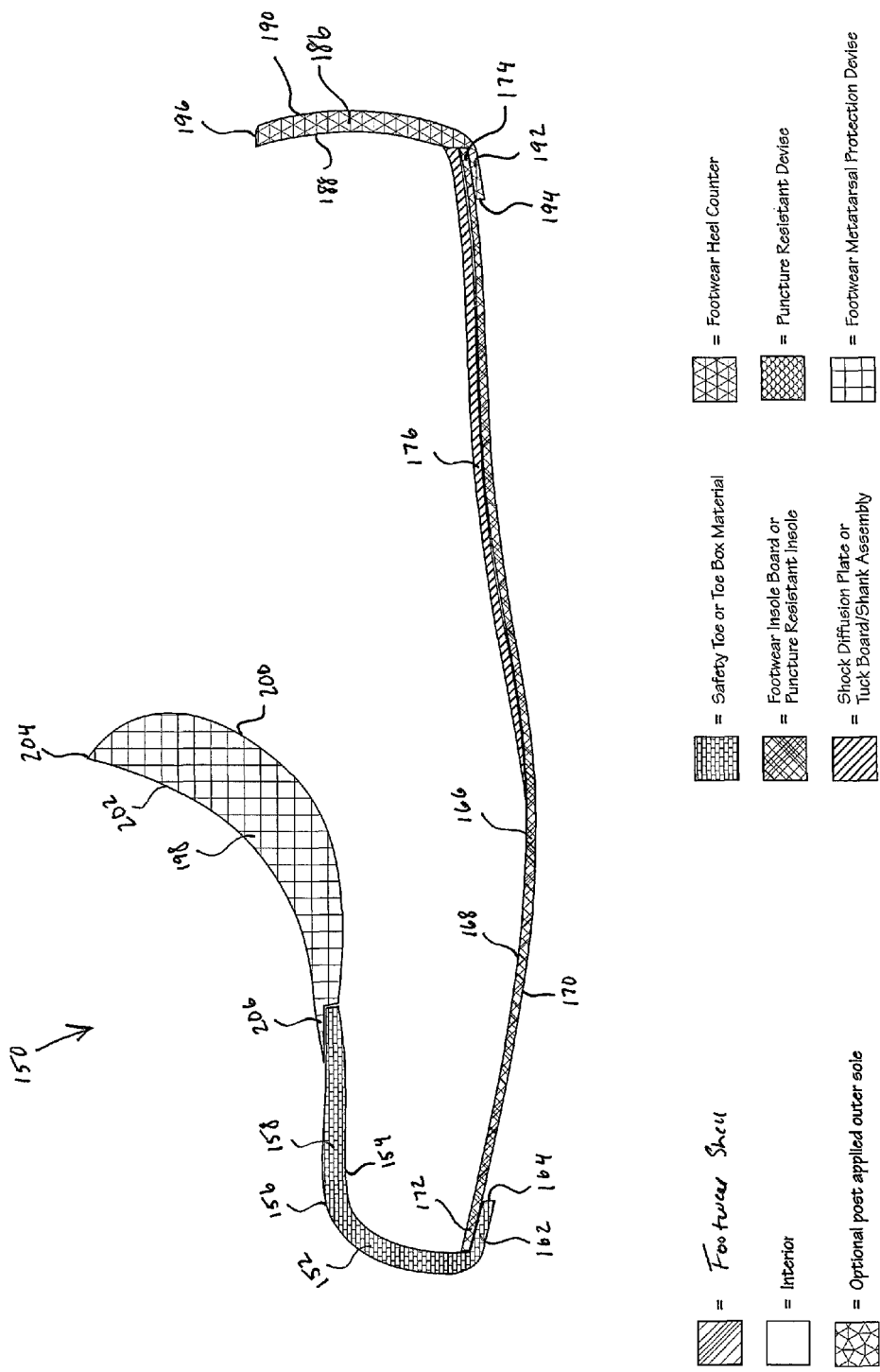

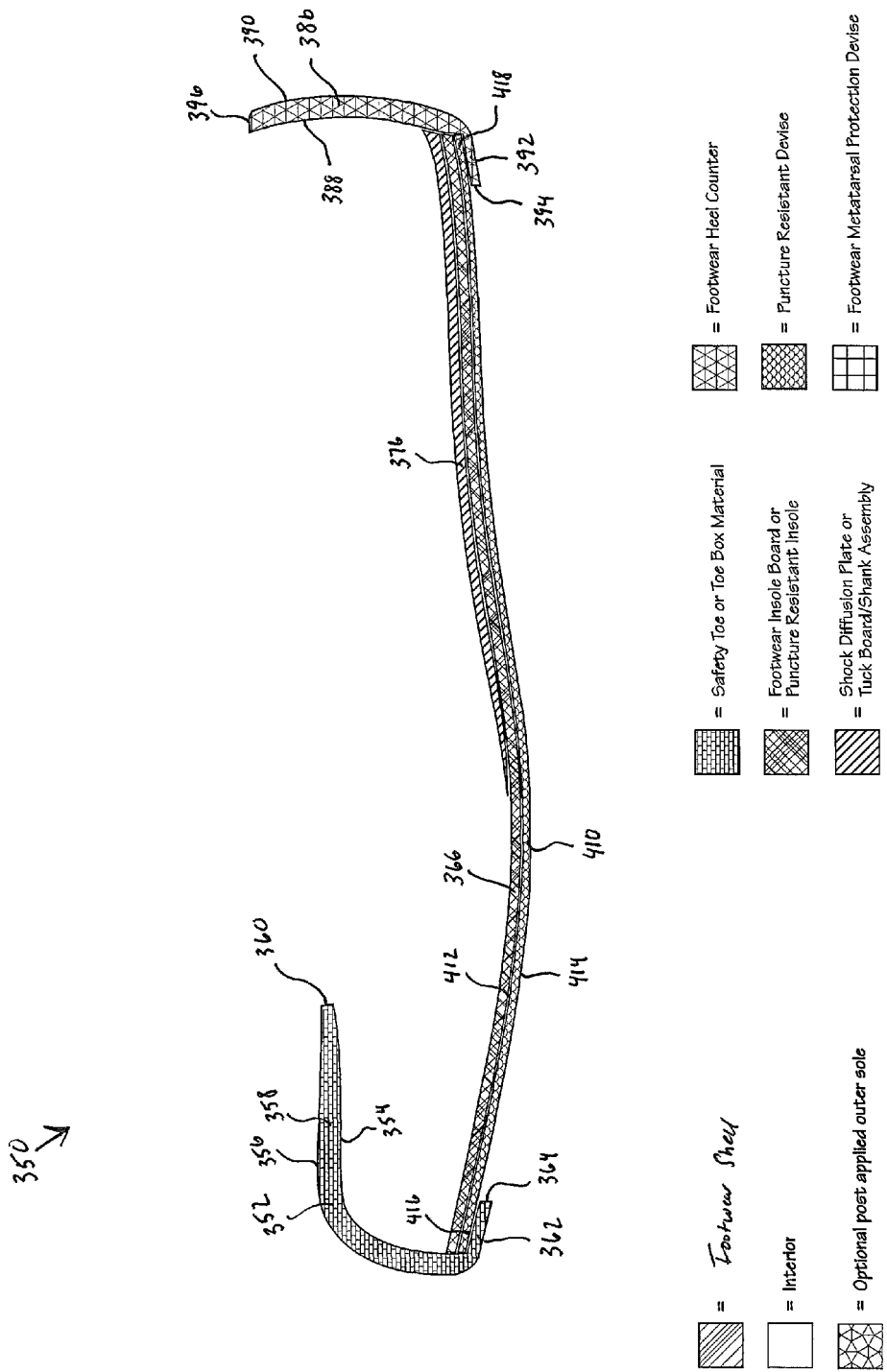

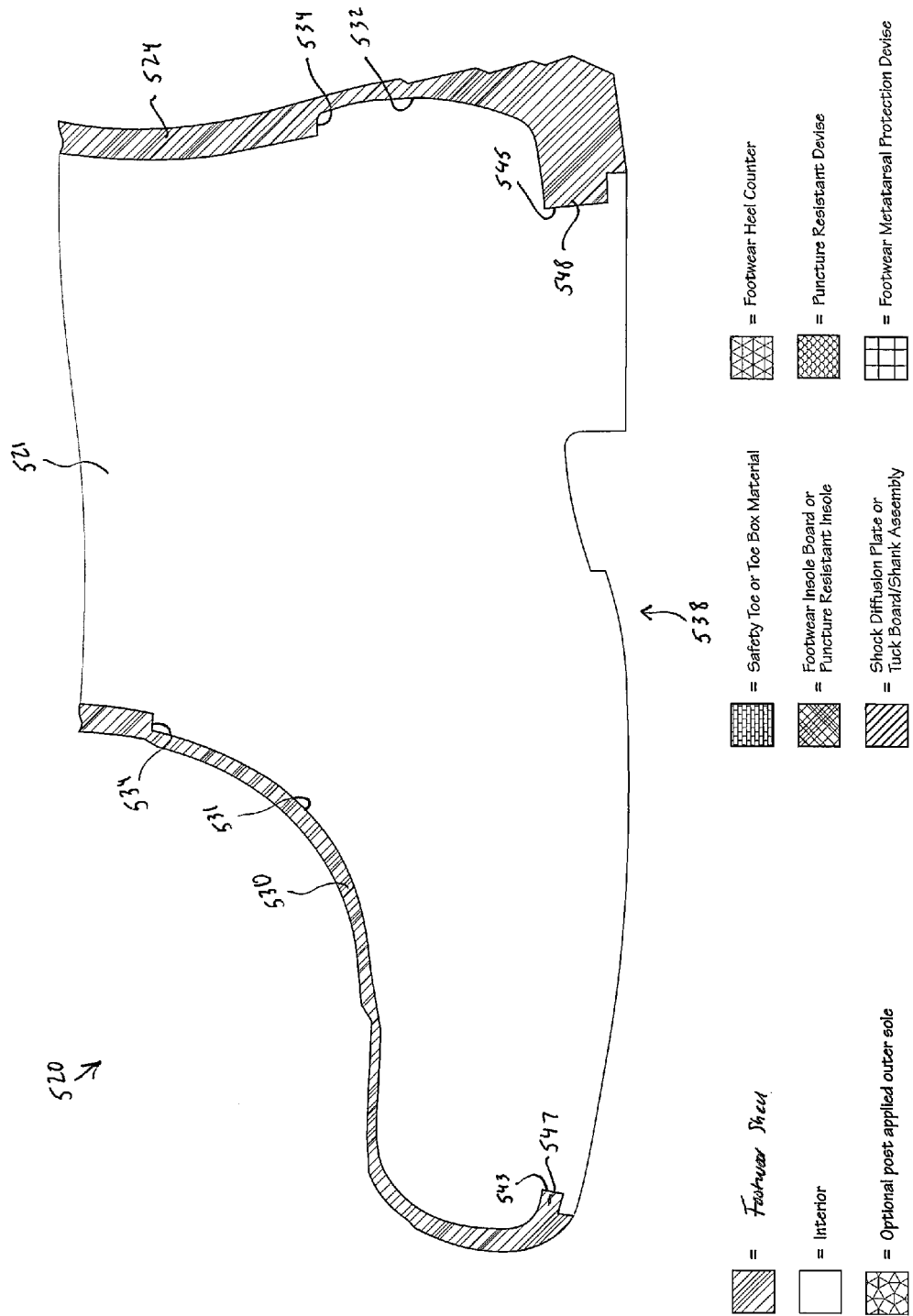

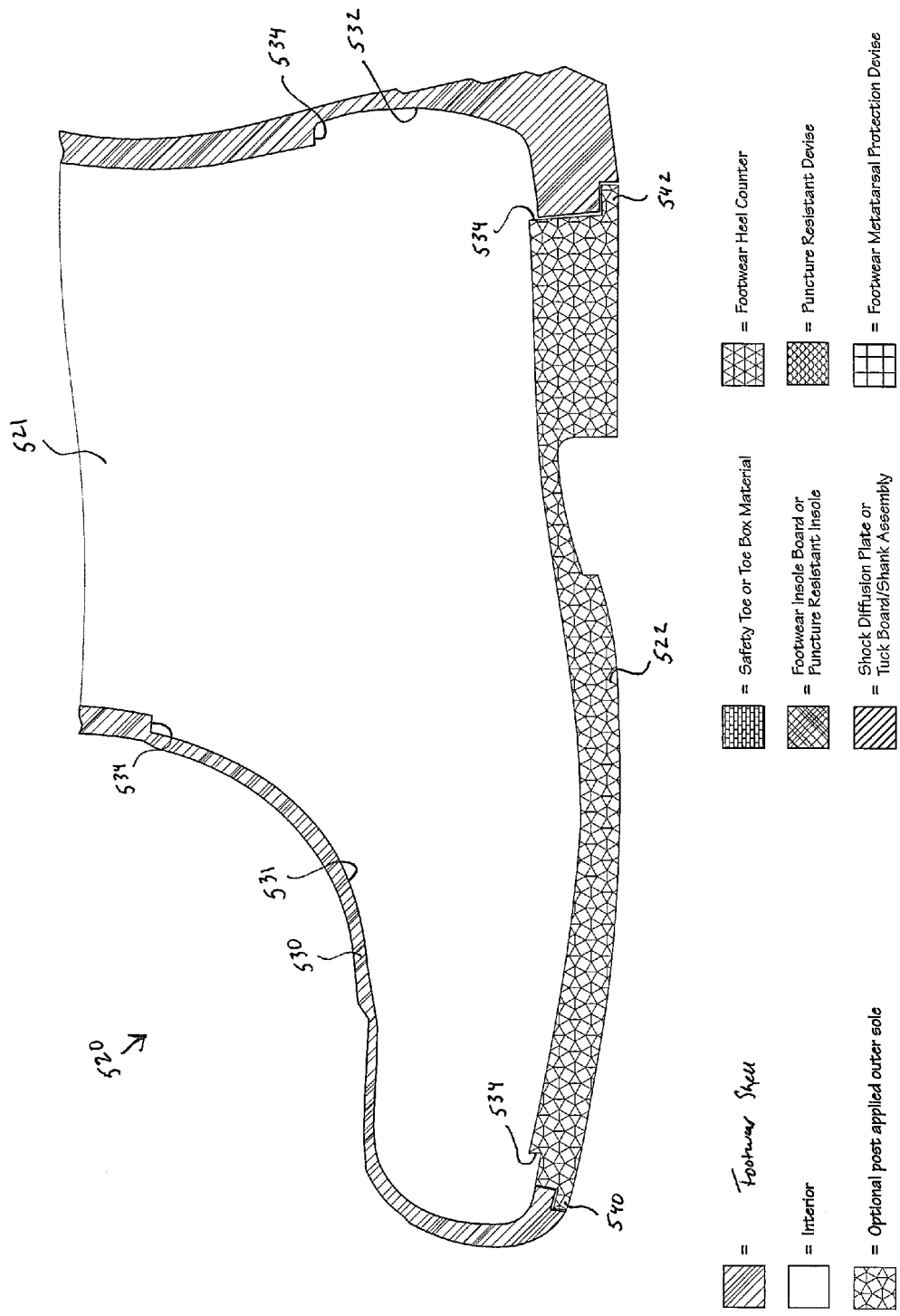

SAFETY FOOTWEAR

CROSS-REFERENCE TO RELATED APPLICATIONS

The present application claims the benefit of the filing date of U.S. Provisional Patent Application No. 61/779,054, filed Mar. 13, 2013, the disclosure of which is hereby incorporated herein by reference.

BACKGROUND OF THE INVENTION

The present invention(s) relates, in general, to safety footwear for use in harsh conditions, such as in a variety of agricultural, food processing, energy exploration, industrial, and/or hazmat environments.

Footwear developed to withstand harsh conditions, such as conditions in which the wearer is subject to constant exposure to water, chemicals, hot or cold temperatures, or natural corrosives, must be constructed to withstand those conditions while maintaining comfort for the wearer. A common area in which certain footwear is subject to one or more of the foregoing environments is, for example, in the oil drilling industry. Currently, drilling platforms may be in an environment in which the ground or working area is constantly muddy, laced with chemicals or corrosive additives used during drilling, or both. Fracking (or hydraulic fracturing) is a practice in the drilling industry in which the aforementioned conditions are commonly present. In such harsh working conditions, footwear often degrades or deteriorates entirely within a short period of time, subjecting the user to unnecessary costs in purchasing footwear at short intervals. For example, certain footwear available in the current market may only last for a period of two (2) or three (3) weeks in such conditions.

It is also the case that, with working conditions such as those encountered in the drilling industry, safety is paramount. Indeed, certain standards (e.g., those prescribed by the American Society for Testing and Materials (ASTM), CSA, or EN-ISO) require that footwear used within these industries meet numerous safety requirements. As an example, any safety components introduced into the footwear must be integral to the construction of and non-removable from the footwear; or in other words, the user cannot remove the safety components once the footwear is purchased. Other safety requirements are also present, of course.

Further, solid elastomer and/or rubber footwear currently used in the above-noted environments tend to be heavy; and, since footwear weight and flexibility are factors that impact human ambulation efficiencies and/or the amount of energy expended during normal work shifts, these considerations may be significant. For example, heavy and/or non-flexible footwear may increase worker fatigue as compared to if lighter and/or more flexible footwear was used.

Particular methods of manufacturing footwear are also known in the industry, one of those being a method in which expandable polymeric materials (e.g., polyolefin elastomers (PE), ethylene-vinyl acetate (EVA), or other such materials) are used. In short, expandable polymeric materials may be placed into an injection mold and formed into various footwear-type components. However, to date, incorporating such expanding footwear with industry and government regulated safety footwear performance features, as outlined in recognized Occupational Standards Bodies (ASTM F2413 and CSA 2195, for example), has not been possible.

Given the foregoing, there exists a need for lightweight footwear that can withstand harsh environments while providing ample safety for the user in those environments.

BRIEF SUMMARY OF THE INVENTION

Aspects of the present invention(s) provide footwear that can withstand harsh environments while providing ample safety for the user in those environments.

As an example, a first aspect of the invention(s) includes a footwear system comprising a shell having an inner cavity and at least one recessed area offset from an inner surface of the shell, and a chassis having one or more components adapted to protect a user's foot from injury, the chassis being insertable into the inner cavity of the shell, such that the one or more components of the chassis are permanently affixed within the at least one recessed area of the shell. In variants of this aspect, each recessed area also includes a set of stop surfaces arranged at an angle to the inner surface of the shell, and each component includes corresponding stop surfaces adapted to engage with the stop surfaces of the shell to retain the component within the recessed area. In some cases, the shell may also be composed of a corrosive-resistant material, or a material selected from the group consisting of a polyolefin elastomer, ethyl vinyl acetate, an expandable polymer, or a co-polymerized material suitable for cross-link foaming in a post-injection expandable foaming process. Further, the chassis may include a toe cap composed of rigid material, a heel counter, an insole board engaged to the top cap and heel counter, and/or a metatarsal guard.

A second aspect of the invention(s) is a method of constructing footwear comprising the steps of: (1) providing a mold having an inner cavity; (2) injecting an expandable material into the inner cavity; (3) removing the expandable material from the inner cavity, such that the material expands to form a footwear-shaped shell, the shell having an inner cavity and at least one recessed area offset from an inner surface of the shell; and (4) inserting a chassis within the inner cavity of the expanded shell, the chassis having one or more components adapted to protect a user's foot from injury, wherein insertion of the chassis within the shell permanently affixes the one or more components within the at least one recessed area of the shell. In embodiments of this aspect, inserting the chassis within the inner cavity of the shell comprises positioning a stop surface of the one or more components so that it interferes with a stop surface arranged adjacent the at least one recessed area. The shell may also comprise a material impermeable to water or other solutions.

BRIEF DESCRIPTION OF THE DRAWINGS

A more complete appreciation of the subject matter of the present invention(s) and of the various advantages thereof can be realized by reference to the following detailed description in which reference is made to the accompanying drawings in which:

FIGS. 2A-C are cross-sectional views of a variant of the footwear system of FIGS. 1A-C.

FIGS. 3A-C are cross-sectional views of yet another variant of the footwear system of FIGS. 1A-2C.

FIGS. 4A-C are cross-sectional views of the shell of yet another variant of the footwear system of FIGS. 1A-3C.

DETAILED DESCRIPTION

In describing certain features of the present invention(s), specific terminology will be used for the sake of clarity. However, the invention(s) is not intended to be limited to any specific terms used herein, and it is to be understood that each specific term includes all technical equivalents, which operate in a similar manner to accomplish a similar purpose.

Figure 1A:
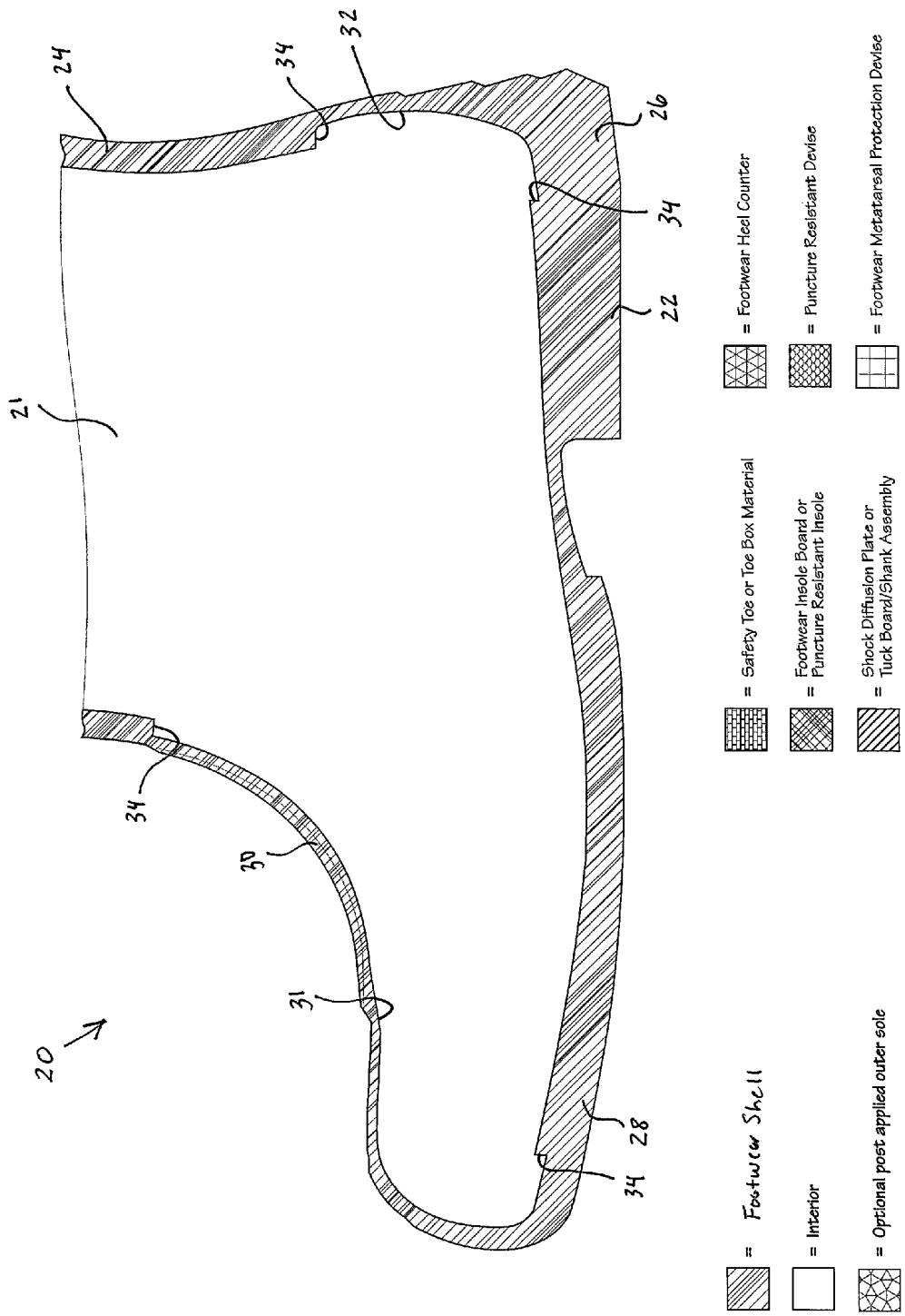
FIGS. 1A-C are cross-sectional views of a footwear system, according to one embodiment of the present invention(s).
Figure 1B:
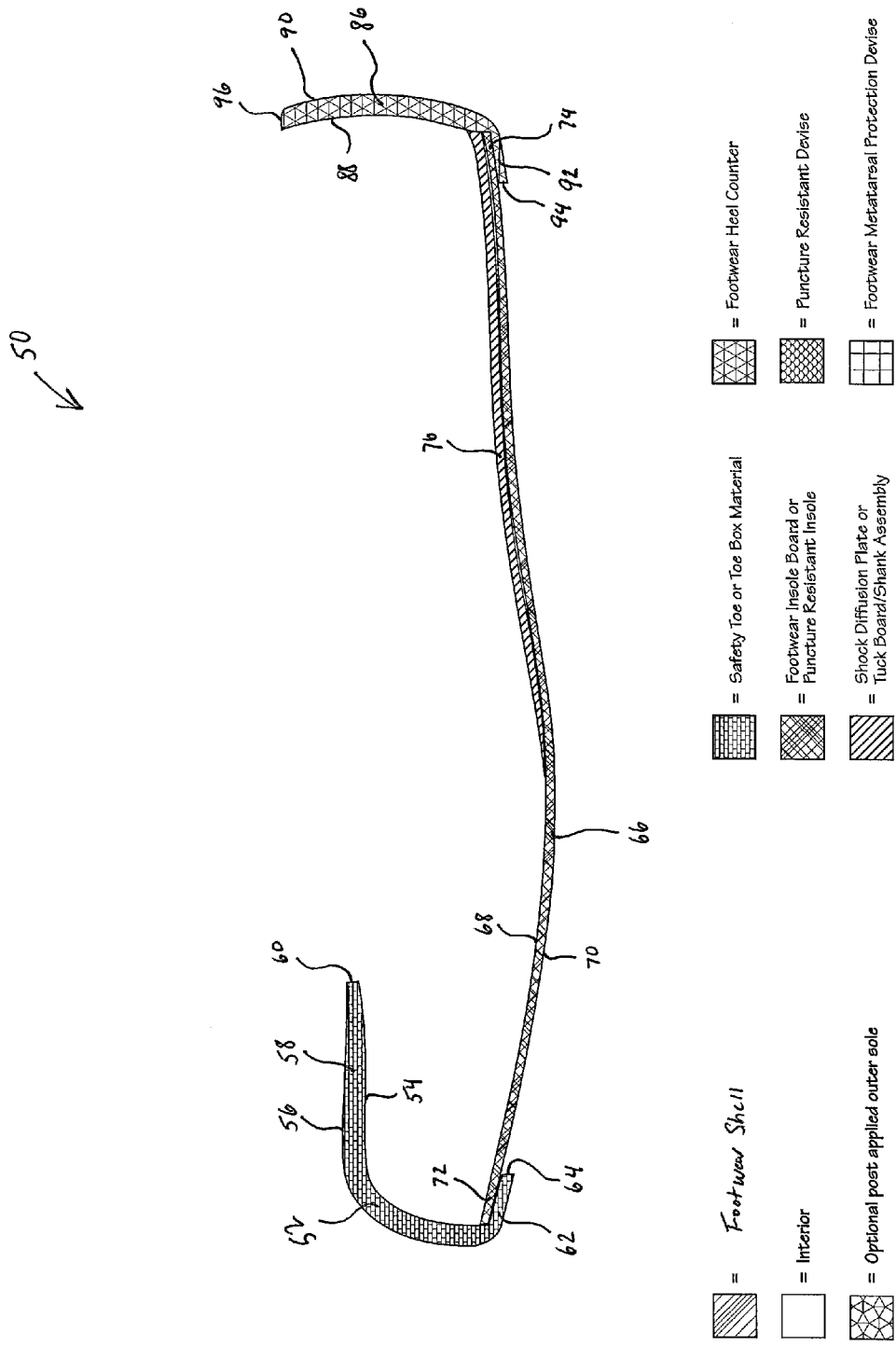
Figure 1C:
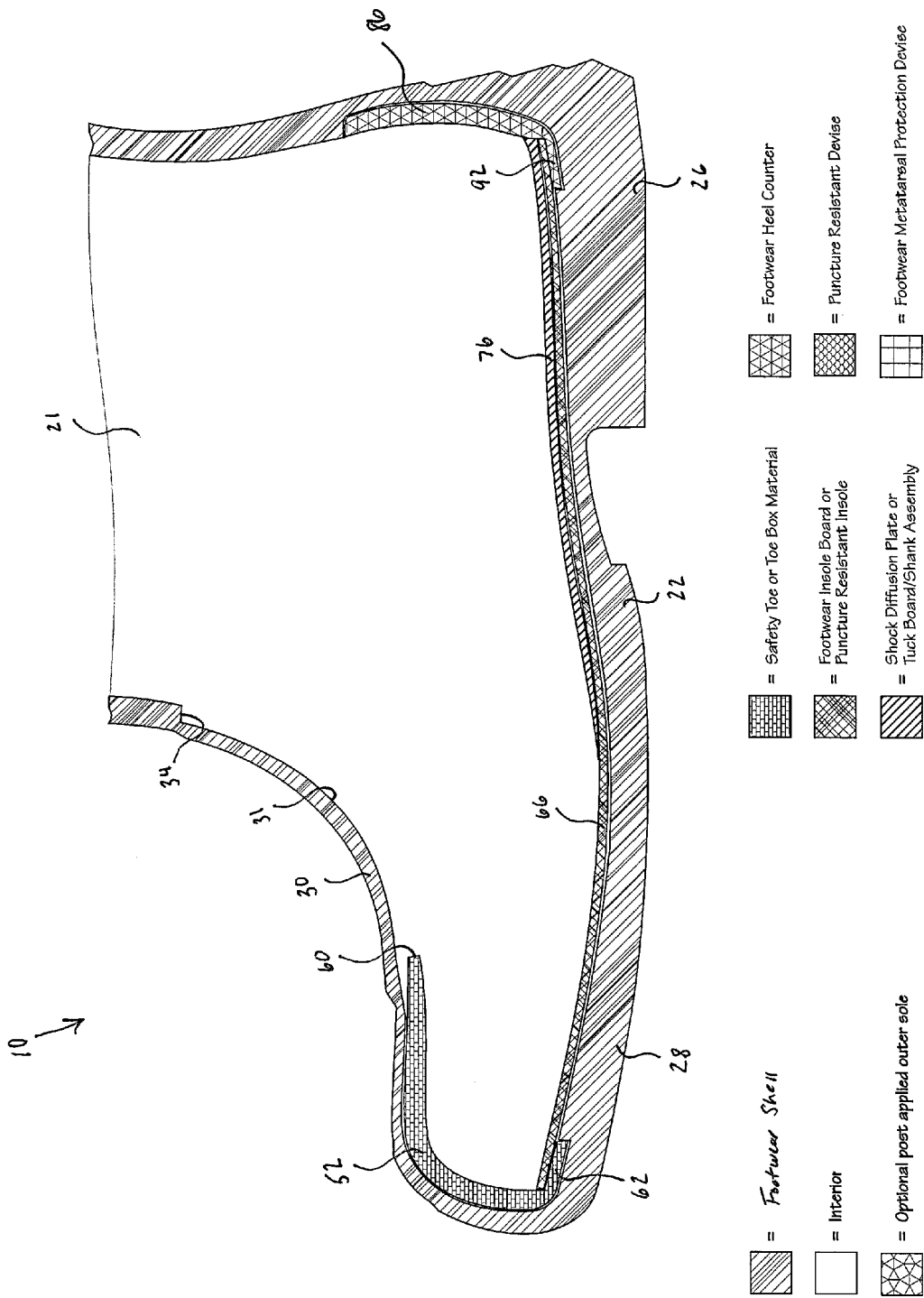

Referring to FIGS. 1A-C, such depicts footwear 10 being composed of a number of components, namely an outer shell and an assembled chassis 50 inserted and secured into the shell 20. FIGS. 1A-B depict, in detail, outer shell 20 and chassis 50, the latter of which may itself include a number of components, particularly: (1) a safety toe box or cap 52; (2) a puncture resistant insole board 66; (3) a shock diffusion plate 76; and (4) a heel counter 86. Other components may also form part of chassis 50, as set forth in additional embodiments discussed below. Nonetheless, in each embodiment, chassis 50 may be inserted into shell 20 and secured thereto so that a user may not remove chassis 50. In this manner, footwear 10 may provide safety for a user in certain dangerous or harsh environments (e.g., in the drilling industry).

As shown in FIG. 1B, in one embodiment chassis 50 may include a toe cap 52 having inner and outer surfaces 54, 56, the toe cap 52 being arrangeable over a user's forefoot region to protect the user's toes from injury due to an impact or other event. Indeed, toe cap 52 may be formed of rigid material, such as a hard polymer, metal, or other material, and include a section 58 overlying a user's toes. Toe cap 52 may also include a lower protruding section 62, in this embodiment, that is connected at its inner surface 54 to insole board 66, as discussed below. Lastly, toe cap 52 may include stop surfaces 60, 64 for engaging with certain stop surfaces in outer shell 20.

Referring still to FIG. 1B, chassis 50 may include, as alluded to above, an insole board 66 that in some cases is puncture resistant. Insole board 66 may have inner and outer surfaces 68, 70 and ends 72, 74, which are connected at their outer surface 70 to toe cap 52 and heel counter 86, respectively.

Heel counter 86 may likewise include inner and outer surfaces 88, 90, and a lower protruding section 92 for engaging with insole board 66. Heel counter 86 may also provide rigidity to chassis 50 at that section so that, when a user inserts his/her foot into footwear 10, stability is provided in the heel region. As with toe cap 52, heel counter 86 also has stop surfaces 94, 96 for engaging with corresponding stop surfaces in shell 20.

Chassis 50 further includes a shock diffusion plate 76 in this embodiment (FIG. 1B) that overlies insole board 66. Shock diffusion plate 76 may, if desired, take the form of tuck board-type material (e.g., standard footwear cellulose, or entangled non-woven or woven-type materials, with or without stiffening agents) that is rigid in nature so as to absorb any shock or force impacted on insole board 66. In an alternate embodiment, shock diffusion plate 76 may be any of the shock diffusion plates shown and described in U.S. Pat. No. 6,205,683 to Clark et al., owned by The Timberland Company, the disclosure of which is hereby incorporated herein by reference. Together, the aforementioned components create one embodiment of chassis 50 that is insertable into shell 20 in the manner discussed below.

Shell 20, as shown in FIG. 1A, may include several aspects common to typical footwear, such as an outsole 22, an upper 24, and heel 26, forefoot 28, and instep 30 sections. In one embodiment, shell 20 is also impermeable to certain substances, such as water, mud, or other solutions or corrosives. Shell 20 may also include an inner cavity 21 shaped to accommodate a user's foot, which has various recessed areas or cutouts 31, 32 for receiving a portion of chassis 50. In one embodiment, recessed areas 31, 32 may be bounded by stop surfaces 34 on either side to receive and securely hold a portion of chassis 50 within the relevant recessed area 31, 32. In a particular embodiment, as shown in FIG. 1A, shell 20 may include two (2) recessed areas 31, 32 for accommodating toe cap 52 and heel counter 86 therein, although more or less recessed areas may be employed.

As shown in FIG. 1C, to construct footwear 10, chassis may be inserted into shell 20, such that toe cap 52 is situated in recessed area 31 of shell 20, and heel counter 86 is likewise situated in separate recessed area 32. Once so inserted into shell 20, stop surface 64 of toe cap 52 and stop surfaces 94, 96 of heel counter 86 may contact respective stop surfaces 34 surrounding recessed areas 31, 32 of shell 20 so that toe cap 52, heel counter 86, and thus chassis 50 are securely retained within shell 20. While not shown in FIG. 1C, in one embodiment stop surface 60 may also contact an alternate stop surface 34 within shell 20 (e.g., recessed area 31 may be made to be smaller so that a stop surface 34 of recessed area 31 contacts stop surface 60 to retain toe cap 52 within shell 20).

To ensure that chassis 50 is not removable from shell 20, in compliance with safety standards, it is possible to cement or otherwise adhere certain portions of chassis 50 to shell 20 (e.g., the whole of chassis 50 or, for example, only insole board 66 may be cemented or adhered to shell 20). Alternatively, it is contemplated that chassis 50 may snap into place within shell 20 so that chassis 50 is non-removable therefrom. In other words, during insertion of chassis 50 within inner cavity 21 of shell 20, a user may press-fit toe cap 52 and heel counter 86 within recessed areas 31, 32, such that chassis 50 is retained within shell 20 due to interference between stop surfaces 34, 64, 94, 96 (and in an alternate embodiment, stop surface 60). This may be achieved by manufacturing chassis 50 so that a dimensional interference is created between chassis 50 and shell 20 (e.g., certain portions of chassis 50, such as toe cap 52 and heel counter 86, may be arranged so that such portions can be press-fit into recessed areas 31, 32). As an example, stop surface 64 on toe cap 52 and stop surface 94 on heel counter 86 may be separated by a first distance, which is slightly less than a second distance separating stop surfaces 34 of recessed areas 31, 32 that contact stop surfaces 64, 94. In this manner, once chassis 50 is inserted into shell 20, stop surfaces 64, 94 may be forced past stop surfaces 34 of recessed areas 31, 32 to securely lock chassis 50 in place (e.g., via a dimensional interference).

With chassis 50 inserted into shell 20, as discussed above, toe cap 52 may adequately ensure that a user's toes are not injured due to an impact event (e.g., an object striking the toes), insole board 66 may provide puncture resistance, shock diffusion plate 76 may diminish or absorb any impact forces borne on the foot, and heel counter 86 may provide support for a user's heel during use. In addition, shell 20 may provide corrosion resistance and/or impermeability with respect to several substances (e.g., water, mud, corrosive liquids/chemicals, etc.)

It is also contemplated that shell 20 (or any of the alternate shells described below) may be manufactured from particular corrosion-resistant materials, such as cross-linking post-injection expansion polyolefin elastomers. As an example, shell 20 may be manufactured through an injection-molding process that uses expandable polymers, such as EVA. In short, during such a process, a mold may be injected with EVA or EVA-type material to form shell 20, and once appropriately cured, shell 20 may be released from the mold into the configuration shown in FIG. 1A (or any of the remaining figures depicting alternate embodiments of shell 20). The curing process may be controlled by subjecting shell 20 to engineered expansion (e.g., controlling ambient conditions, temperature, time, etc.)

Stated differently, as injected into the mold, shell may be relatively smaller than in its final configuration (FIG. 1A), and once released, shell 20 may expand to its final state. Then, after shell 20 has been released from the mold and allowed to expand to its final form (FIG. 1A, or the other figures depicting the shell), chassis 50 may be inserted into and secured within shell 20 in the manner discussed previously. As such, through this process, it is possible to manufacture footwear 10 meeting the various requirements mandated in certain industries (e.g., the non-removability of safety components), such as in the drilling industry. In addition, footwear 10 utilizing the aforementioned features not only provides comfort for the user, along with safety, but also lasts far longer in corrosive environments than other existing arrangements. As such, within these industries, the consumer is not forced to purchase footwear 10 at exceedingly short intervals of time.

Figure 2A:
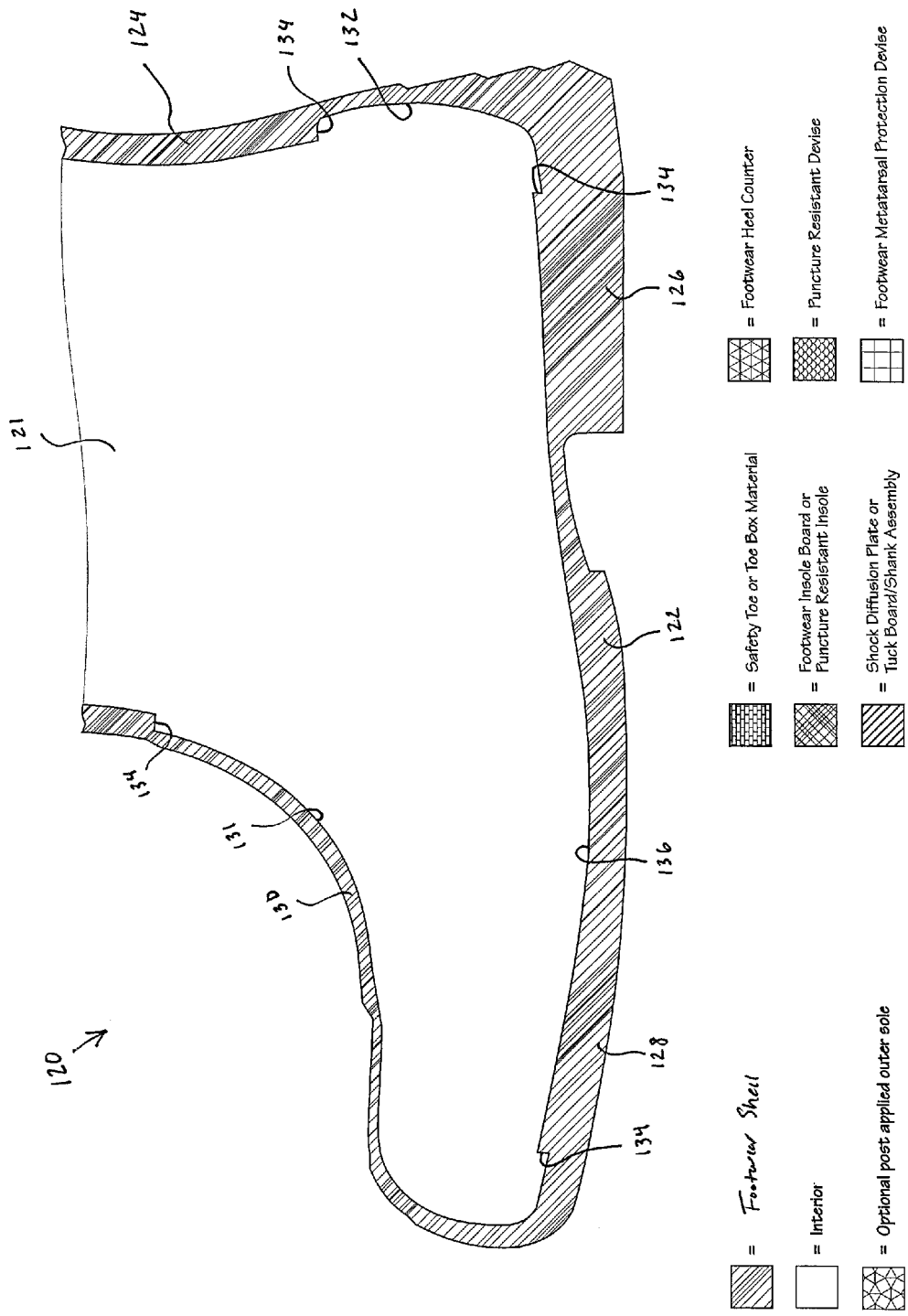
Figure 2C:
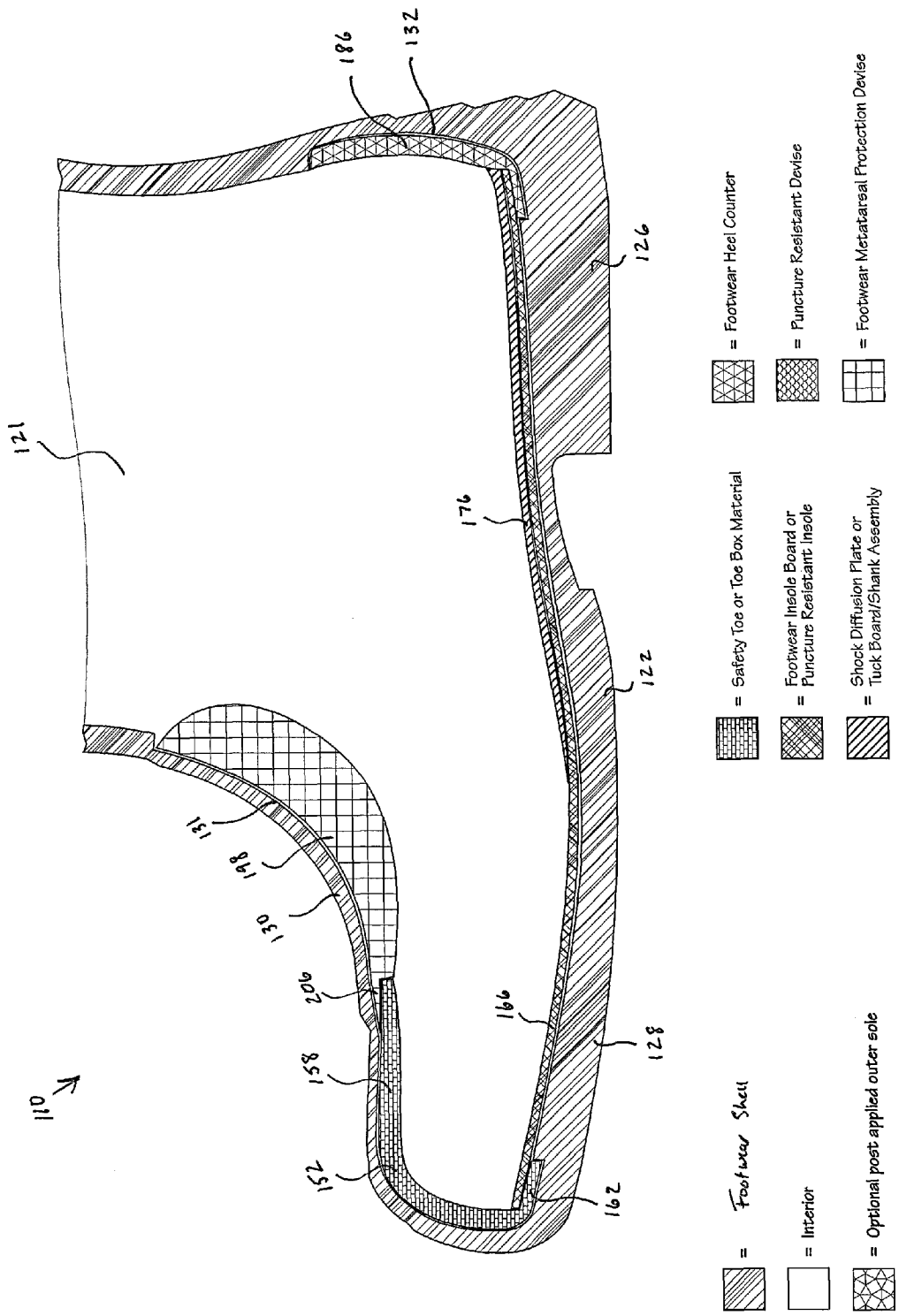

An alternate version of footwear 10 is shown in FIGS. 2A-C, in which chassis 50 and shell 20 are slightly modified. Here, like numerals refer to like elements, except where indicated (although reference numerals are in the 100-series instead of, as an example, the 10-series).

Referring to FIG. 2B, chassis 150 is generally the same as chassis 50, except that chassis 150 includes a metatarsal guard 198. Metatarsal guard 198 may have respective inner and outer surfaces 200, 202 and an end 206 that connects with toe cap 152. In one embodiment, end 206 includes an L-shaped groove that connects with toe cap 152 so that both components are an integral unit forming part of chassis 150. In some cases, metatarsal guard 198 may take the form of any of the metatarsal guards shown or otherwise described in U.S. patent application Ser. No. 13/648,839 (the '839 Application), entitled "Protection Devices for Use in Shoes or Other Products," the disclosure of which is hereby incorporated by reference herein. As taught in the '839 Application, a metatarsal guard, such as metatarsal guard 198, may be positioned over the metatarsal region of a user's foot to protect the same from injury. In particular, as shown in FIG. 2C, metatarsal guard 198 may be positioned within instep 130 of shell 120 to overlie the metatarsal region of the user's foot.

FIG. 2A depicts shell 120 as having a recessed area 131 that extends from a portion of a floor 136 of shell 120 adjacent forefoot end 128 to a section of shell 120 adjacent instep 130. Thus, in this embodiment, recessed area 131 may be designed specifically to accommodate metatarsal guard 198 and toe cap 152, in combination. Recessed area 132 may be of the same configuration and shape as recessed area 32 of the previous embodiment of shell 20 so that heel counter 186 may be received within such recessed area 132. Metatarsal guard 198 may also include a stop surface 204 (FIG. 2B) that engages with stop surface 134 bordering recessed area 131 upon insertion of chassis 150 within shell 120.

Much like the previous embodiment, to assemble footwear 110, chassis 150 may be inserted within inner cavity 121 of shell 120 so that heel counter 186 is received within recessed area 132, and metatarsal guard 198 and toe cap 152 are received within recessed area 131. In particular, stop surfaces 194, 196 of heel counter 186 may engage with stop surfaces 134 of recessed area 132 to secure heel counter 186 within recessed area 132, and stop surface 164 of toe cap 152 and stop surface 204 of metatarsal guard 198 may engage with stop surfaces 134 of recessed area 131 to secure toe cap 152 and metatarsal guard 198 within recessed area 131. In one embodiment, the aforementioned components of chassis 150 (e.g., heel counter 186, toe cap 152, and metatarsal guard 198) may also be cemented or adhered within recessed areas 131, 132 so that chassis 150 may be non-removable from shell 120. Alternatively, it is contemplated that chassis 150 may simply snap into place within recessed areas 131, 132, such that chassis 150 is not removable from shell 120, as detailed more fully above. Indeed, as an example, a distance between stop surface 164 of toe cap 152 and stop surface 204 of metatarsal guard 198 may be greater than a distance between stop surfaces 134 of recessed area 131, such that toe cap 152 and metatarsal guard 198 may be press-fit into recessed area 131. The same may be true for heel counter 186 and recessed area 132, in one embodiment.

Figure 3A:
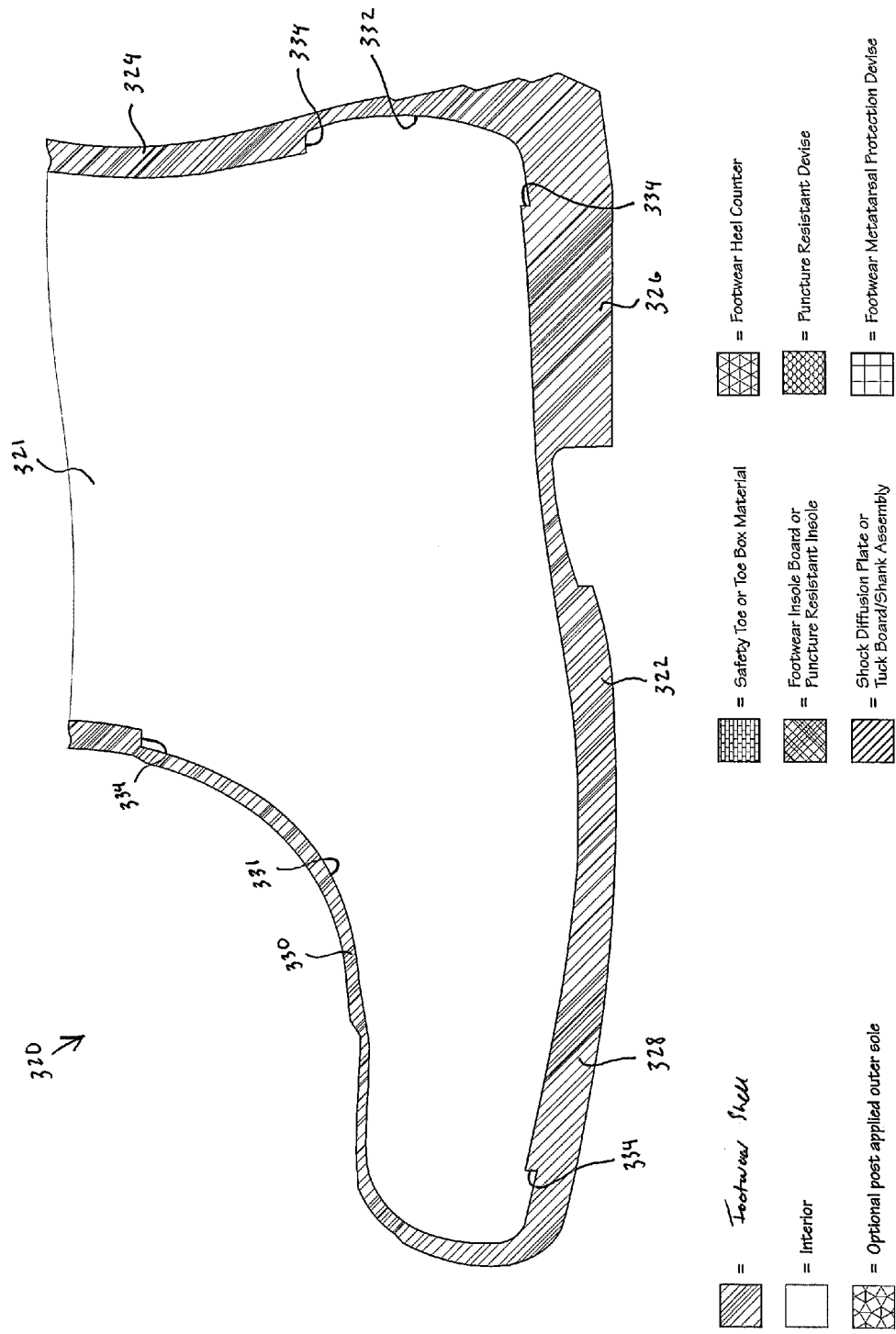
Figure 3C:
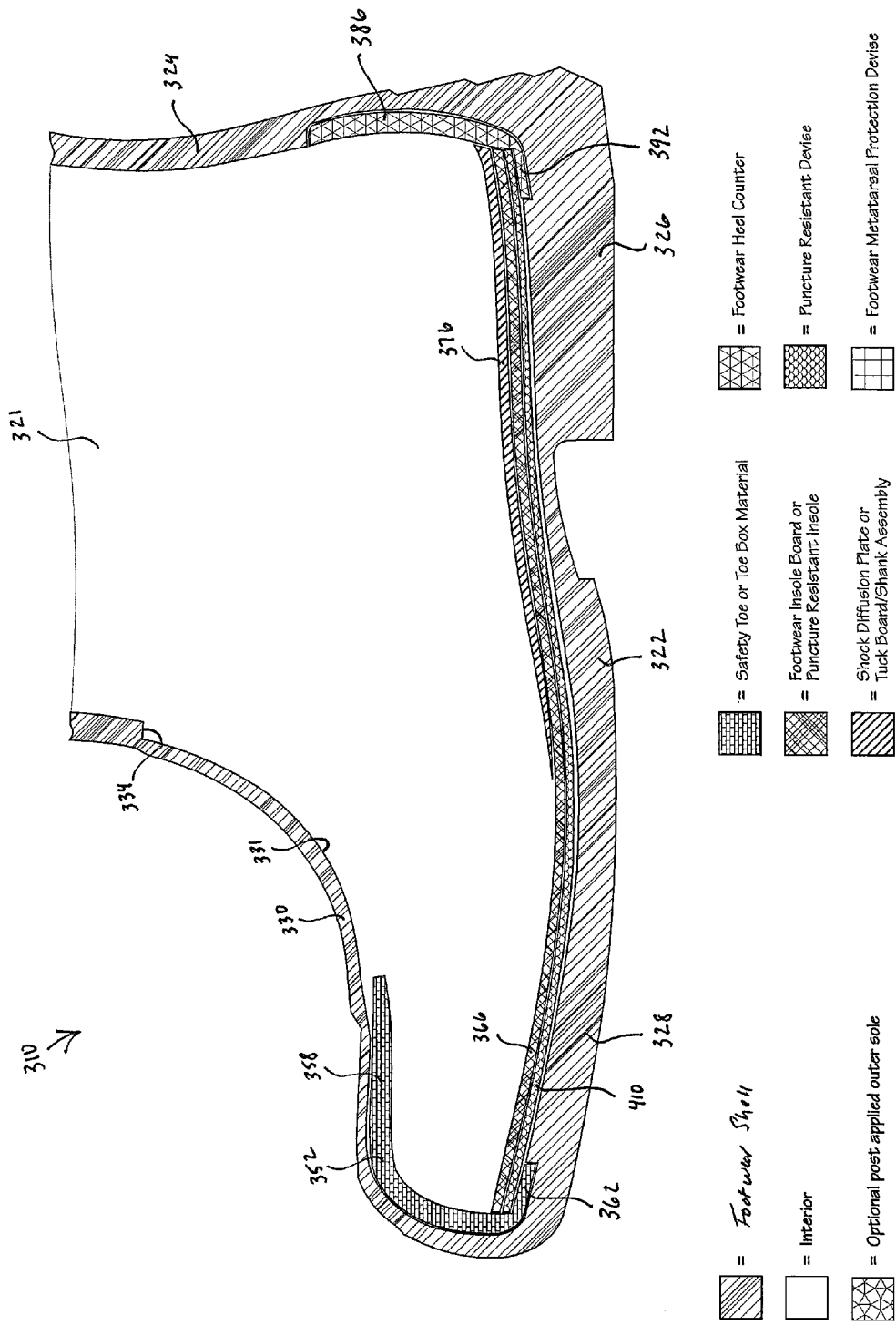

Referring to FIGS. 3A-C, an alternate embodiment of footwear 10, 110, namely footwear 310, is shown. As with above, like numerals refer to like elements in this embodiment, although in the 300-series instead of, as an example, the 10-series.

As shown in FIG. 3B, chassis 350 is generally the same as chassis 50 (FIGS. 1A-C), except that chassis 350 may include an insole 410 that is specifically configured to be puncture resistant (e.g., via being composed of rigid material (s), such as metal, hard plastics or composites, etc.) Thus, although insole board 366 may have puncture-resistant characteristics as well, insole 410 may provide yet additional puncture resistance to chassis 350. Referring to FIG. 3B, insole 410 may have inner and outer surfaces 412, 414 and respective toe and heel ends 416, 418, the outer surface 414 of such ends 416, 418 being bonded, respectively, to lower protruding section 362 of toe cap 352 and lower protruding section 392 of heel counter 386. As such, insole 410 may overly the inner surfaces 354, 388 of lower protruding sections 362, 392 of toe cap 352 and heel counter 386, respectively.

Referring now to FIG. 3A, shell 320 in this embodiment may be generally identical to the previous shells 20, 120 so as to accommodate chassis 350. Thus, the assembly of footwear 310, as shown in FIG. 3C, may proceed substantially as discussed above with respect to footwear 10 of FIGS. 1A-C (with the addition of added puncture resistance via insole 410). As such, chassis 350 may be non-removable from shell 320, as in previous embodiments, so that footwear 310 satisfies certain safety requirements of various recognized regulatory bodies.

Figure 4B:
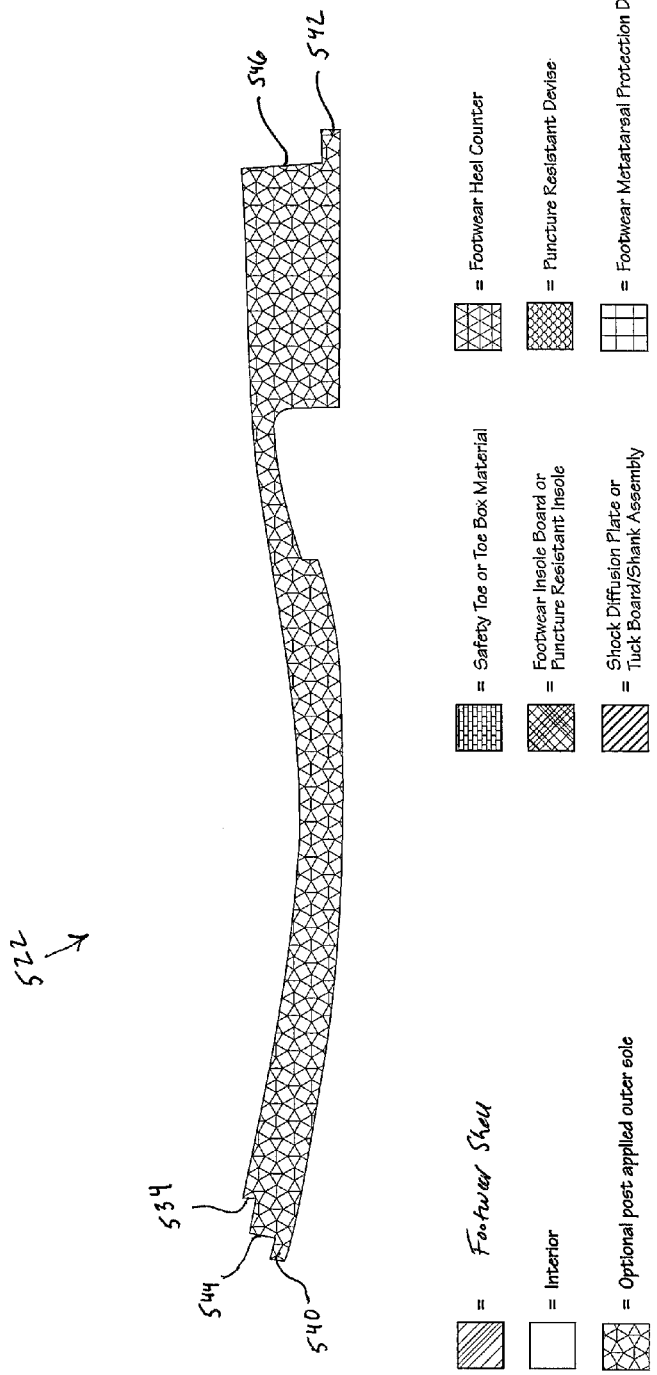

A further variant of footwear 10, 110, 310 may be provided, the shell 520 of which is shown in FIGS. 4A-C. In this embodiment, as shown in FIG. 4A, the footwear shell 520 may include an opening 538. Opening 538 may be shaped to accommodate an outsole 522 (FIG. 4B) that is applied to shell 520 after manufacture thereof. Thus, opening 538 may be specifically configured to accommodate outsole 522.

For example, as shown in FIG. 4B, outsole 522 may include a set of flanges 540, 542 and stop surfaces 544, 546 adjacent such flanges 540, 542; and, to fully construct shell 520, outsole 522 may be inserted through opening 538, such that flanges 540, 542 engage corresponding flanges 547, 548 of shell 520 (FIG. 4A) and stop surfaces 544, 546 engage respective stop surfaces 543, 545 formed adjacent flanges 547, 548 of shell 520. The engagement between shell 520 and outsole 522 is shown in detail in FIG. 4C. Thus, outsole 522 may be securely retained within shell 520 post-manufacture of shell 520. Indeed, in one embodiment, outsole 522 is cemented to shell 520, or adhered via an adhesive, chemical bonding, etc.

Once adhered to shell 520, outsole 522 may serve to create the same configuration as the previously-described shells 20, 120, 320. Indeed, referring to FIG. 4C, a portion of outsole 522 adjacent flange 540 may create a stop surface 534 forming part of recessed area 531, and a portion of stop surface 546 of outsole 522 may act as a stop surface 534 for recessed area 532, as shown. As such, once outsole 522 is attached to shell 520, any of the aforementioned chassis 50, 150, 350 may be inserted into and secured within shell 520 in the manner described previously. In other embodiments, it is also contemplated that the size of opening 538 and the configuration of outsole 522 may be modified, if desired.

Figure 5A:
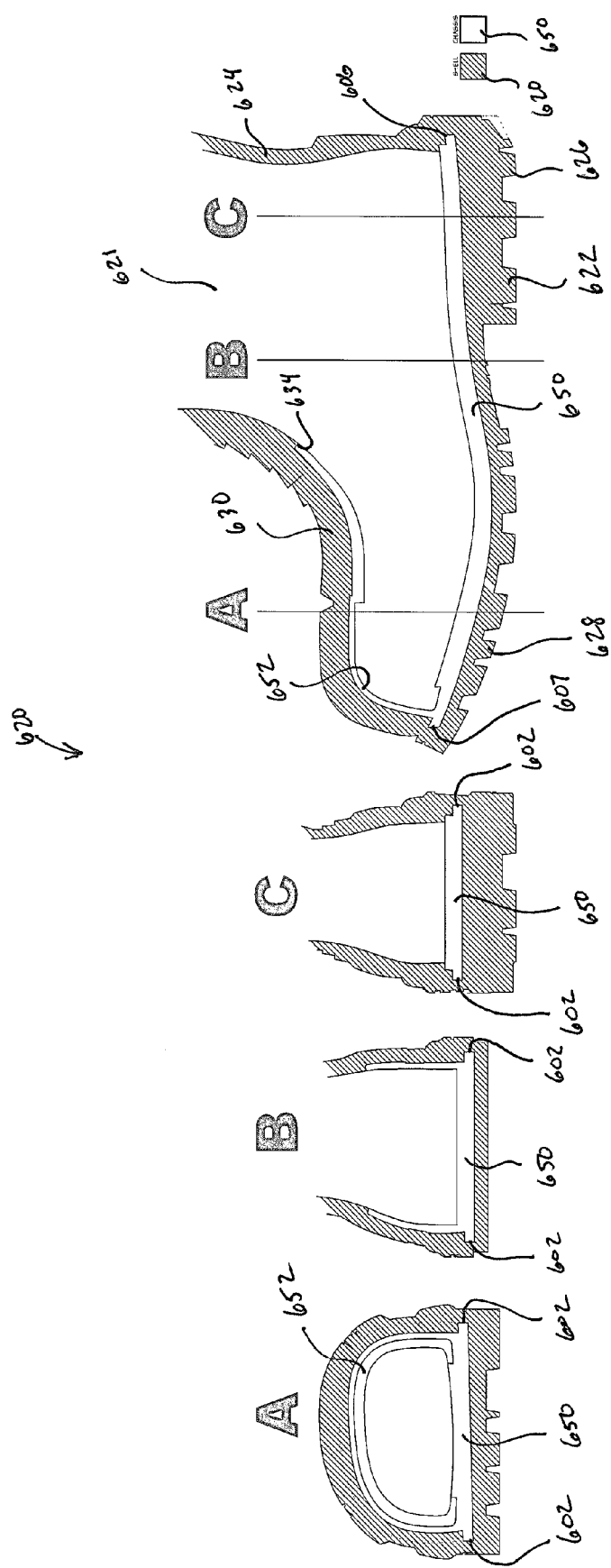
FIGS. 5A-B are cross-sectional views of the shell and chassis of still yet another variant of the footwear system of FIGS. 1A-4C.
Figure 5B:
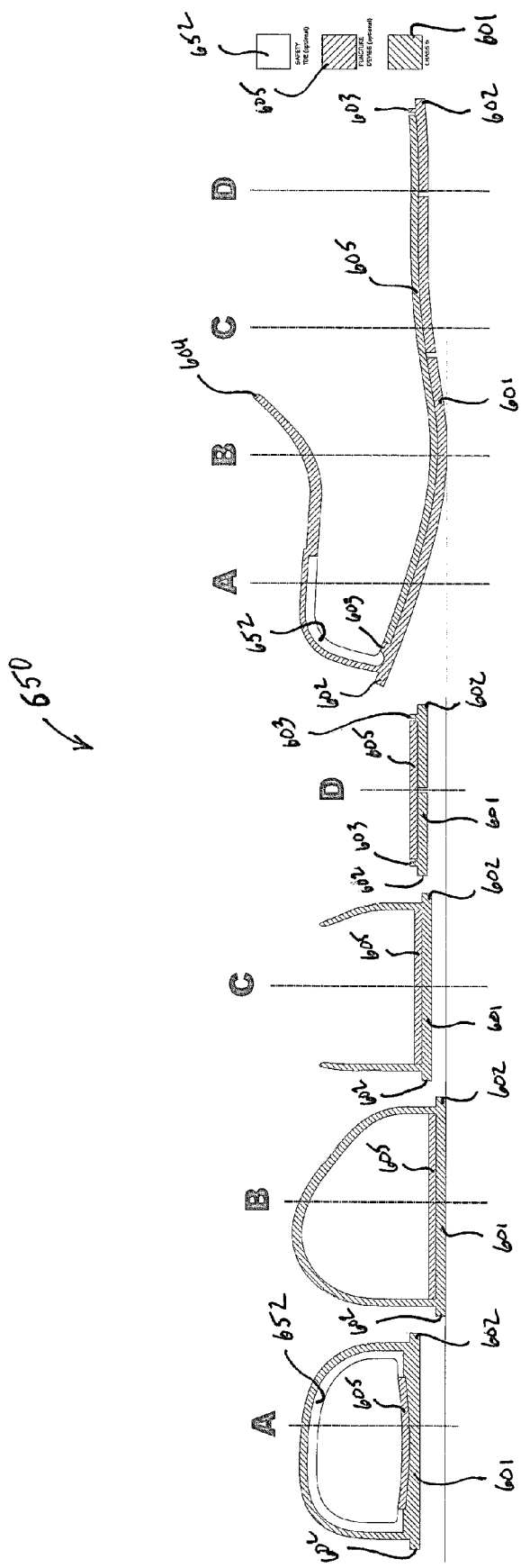

Yet an additional variant of footwear is shown in FIGS. 5A-B. In this variant, as with the others, like reference numerals refer to like elements unless otherwise indicated (although in the 600-series instead of, as an example, the 10-series).

Referring to FIG. 5A, an alternate shell 620 is shown. Shell 620 may be made of any of the materials and according to any of the processes as set forth above for shells 20, 120, 320, 520. Shell 620 includes an internal cavity 621, an upper 624, an outsole 622, and heel 626, forefoot 628, and instep 630 sections, as with shells 20, 120, 320, 520. Shell 620 differs from shells 20, 120, 320, 520, however, in that it has a different arrangement for engaging with its corresponding chassis 650, shown in FIG. 5B. Indeed, shell 620 includes a set of recesses 606, 607 for engaging with certain sections of chassis 650 (described in more detail below) to retain chassis 650 within shell 620. Recesses 606, 607, in a preferred embodiment, extend substantially entirely or entirely around the perimeter of shell 620, as shown in FIGS. 5A-B, although it is contemplated that recesses 606, 607 may alternatively be formed along only certain sections of the perimeter of shell 620 and not along other sections. In one embodiment, recess 606 may be stepped to engage with a correspondingly-shaped section of chassis 650.

Chassis 650 is shown in FIG. 5B (and represented in outline in FIG. 5A). Chassis 650 includes a chassis body 601 and, in some cases, an optional puncture device 605 overlying a section of chassis body 601. Puncture device 605 may protect a user's foot from damage due to a sharp object puncturing through chassis body 601, and thus, puncture device 605 is constructed of a rigid material adapted to block the object from puncturing through device 605 and injuring the user's foot. Chassis 650 also includes an optional safety toe 652 (not shown). Although safety toe 652 is not actually shown in the figures, it is represented by a cavity in the area of chassis 650 where safety toe 652 would be located. In one embodiment, safety toe 652 may be press-fit, adhered, or otherwise secured within that cavity of chassis 650, if desired, so that chassis 650 includes a safety toe 652 for protection. Safety toe 652, as with the previous toe caps 52, 152, 352, may be formed of rigid material, such as a hard polymer, metal, or other material, and include a section overlying a user's toes to protect the toes from injury (e.g., due to a heavy object falling on the user's toe area).

In one embodiment, chassis body 601 also includes specific geometries for engaging with shell 620. For instance, chassis body 601 includes a set of flanges 602 for engaging with recesses 606, 607 in shell 620, and a set of projections 603 for receiving optional puncture device 605 and/or contacting a section of recess 606 (e.g., in the case of the right-side projection 603 in FIG. 5B). Flanges 602 may be formed entirely or substantially entirely around the perimeter of chassis 650, as shown in FIGS. 5A-B, so that, once engaged, chassis 650 is not removable from shell 620 (e.g., during ordinary use by the user). In alternate embodiments, flanges 602 are formed only along certain sections of the perimeter of chassis 650, but not along other sections. Chassis body 601 also includes a stop surface/end 604 for engaging with a separate stop surface 634 of shell 620.

To insert chassis 650 within shell 620 so that the combined unit is usable as footwear, shell 620 may first be produced according to the methods discussed above and allowed to expand to its final state (e.g., by using expandable EVA materials inserted into a mold). Then, chassis 650 may be inserted into cavity 621 of shell 620, such that its flanges 602 are arranged within recesses 606, 607, as shown in outline in FIG. 5A. This acts to at least partially retain chassis 650 within shell 620, such that chassis 650 cannot be removed by a user. In other words, since flanges 602 are engaged with recesses 606, 607 about substantially or the entire perimeter of chassis 650 and shell 620, as shown in outline in FIG. 5A, chassis 650 is securely retained within shell 620.

During insertion of chassis 650 into shell 620, stop/end surface 604 of chassis 650 may also come to rest on stop surface 634 of shell 620 to assist in securing chassis 650 relative to shell 620. In one embodiment, a step is also formed in chassis body 601 and shell 620 adjacent instep region 630 for even further enhanced engagement between chassis 650 and shell 620 at that area. With chassis 650 secured in shell 620, for example through press-fitting, adhering, cementing, or otherwise securing chassis 650 into shell 620, as described in more detail with reference to the previous embodiments, the user may utilize the footwear of this embodiment in applicable industrial or other environments and obtain adequate protection.

In the devices depicted in the figures, particular structures are shown that are adapted for use in footwear, such devices serving to protect the foot of a user and provide compliance with certain safety standards. The use of alternative structures for such purposes, including structures having different lengths, shapes, and configurations is also contemplated. As an example, while the disclosed footwear is described above in connection with use in the drilling industry, such footwear is equally usable in other industries in which corrosive environments and/or safety hazards are encountered. For instance, the footwear may be equally usable in the context of the hazmat, food processing, environmental clean-up, or other such industries. Put simply, the footwear has applicability in any area in which the working environment includes the presence of corrosive materials and/or safety dangers.

As another example, it is contemplated that stop surfaces 34, 134, 334, 534, 634 of respective shells 20, 120, 320, 520, 620 may be angled in certain embodiments to better retain chassis 50, 150, 350, 650; and that, if necessary, the respective stop surfaces of chassis 50, 150, 350, 650 that engage stop surfaces 34, 134, 334, 534, 634 of shells 20, 120, 320, 520, 620 may be angled as well. In other words, in one embodiment, stop surfaces 34, 134, 334, 534, 634 of respective shells 20, 120, 320, 520, 620 may be arranged so that an acute angle is formed at the junction of the inner surface of shells 20, 120, 320, 520, 620 and the relevant stop surface 24, 134, 334, 534, 634. In this manner, the respective component of chassis 50, 150, 350, 650 (e.g., toe cap 52,

152, 352, 652, heel counter 86, 186, 386, and/or metatarsal guard 198) may be more securely retained within shell 20, 120, 320, 520, 620 via the interaction between the stop surface(s) of those components, and the angled stop surfaces 34, 134, 334, 534, 634 of shells 20, 120, 320, 520, 620. Of course, in some cases several of stop surfaces 34, 134, 334, 534, 634 of shells 20, 120, 320, 520, 620 may be arranged at an acute angle while others are arranged as shown in the figures and described above. Thus, varying combinations are possible. It is also the case that the stop surface(s) on certain components of chassis 50, 150, 350, 650 (e.g., toe cap 52, 152, 352, 652, heel counter 86, 186, 386, and/or metatarsal guard 198) may be angled as well to mate with the acute angle of stop surfaces 34, 134, 334, 534, 634.

As yet another example, while metatarsal guard 198 is not shown in connection with chassis 350 of FIG. 3B, it is contemplated that guard 198 may be situated on chassis 350 in much the same manner as chassis 150. Thus, certain components from one of chassis 50, 150, 350, 650 may be substituted or added to another of chassis 50, 150, 350, 650, although not depicted in the figures.

Further, it is also contemplated that the various components of chassis 50, 150, 350, 650 may be arranged differently than shown in the figures. For example, while puncture-resistant insole 410 is shown as being attached to inner surfaces 354, 388 of toe cap 352 and heel counter 386, respectively, insole 410 may be arranged to overlay toe cap 352 and heel counter 386 (e.g., be attached to outer surfaces 356, 390 thereof). In such an embodiment, shell 320 (in particular recessed areas 331, 332) may also be reconfigured so that chassis 350 is securely retained within shell 320. Thus, a number of different configurations are contemplated in which the various chassis 50, 150, 350, 650 may be rearranged and accommodated, securely, within one of shells 20, 120, 320, 520, 620.

As yet another example, it is contemplated that any of chassis 50, 150, 350, 650 may be composed of expandable materials (like shells 20, 120, 320, 520, 620) so that, once inserted into shell 20, 120, 320, 520, 620, the chassis 50, 150, 350, 650 may expand and be more securely retained within recessed areas 31, 32, 131, 132, 331, 332, 531, 532. The expandable materials that could be utilized to compose chassis 50, 150, 350, 650 are set forth above.

It is also the case that shells 20, 120, 320, 520, 620, while described above as being formed via the use of expandable materials, may alternatively be formed with non-expandable materials (e.g., traditional rubber materials, other composites, etc.) In short, the concepts of the present invention(s) have applicability with non-expandable shells 20, 120, 320, 520, 620 in that such shells 20, 120, 320, 520, 620 may receive any of chassis 50, 150, 350, 650 securely therein to adequately comply with the aforementioned safety standards. The chassis 50, 150, 350, 650, once inserted within the particular shell 20, 120, 320, 520, 620, however, would likely be non-removable from such shell 20, 120, 320, 520, 620 to meet those standards.

Although aspects of the invention(s) herein have been described with reference to particular embodiments, it is to be understood that these embodiments are merely illustrative of aspects of the present invention(s). It is therefore to be understood that numerous modifications may be made to the illustrative embodiments and that other arrangements may be devised without departing from the spirit and scope of the present invention(s) as set forth in the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:

1. A shoe comprising:
a shoe-shaped shell having an inner cavity defined by an inner wall surface of the shell, and at least one recessed area having a wall portion offset from and contiguous with the inner wall surface of the shell; wherein the at least one recessed area includes a set of stop surfaces arranged at an angle to the inner wall surface of the shell, and the one or more components include corresponding stop surfaces adapted to engage with the stop surfaces of the shell to retain the component within the recessed area; and a chassis having one or more components adapted to protect a user's foot from injury, wherein the chassis includes a toe cap, a heel counter, and an insole board engaged to the toe cap and heel counter, the toe cap occupying a toe section of the shell and being composed of a rigid, hard material configured to protect a user's toes from injury, and wherein the one or more components comprise the toe cap and heel counter, the chassis being insertable into the inner cavity of the shell, such that the one or more components of the chassis are permanently affixed by cementing or adhesion within the at least one recessed area of the shell.

2. The shoe according to claim 1, wherein the at least one recessed area of the shell is bounded by a stop surface arranged at an angle to the inner wall surface of the shell, and the one or more components include a corresponding stop surface adapted to engage with the stop surface of the shell to retain the one or more components within the recessed area.

3. The shoe according to claim 1, wherein the shell is composed of a corrosive-resistant material, or a material selected from the group consisting of a polyolefin elastomer, ethyl vinyl acetate, an expandable polymer, or a co-polymerized material suitable for cross-link foaming in a post-injection expandable foaming process.

4. The shoe according to claim 1, wherein the chassis includes a metatarsal guard adapted to be positioned over a user's metatarsal region to protect the user's metatarsal region from injury.

5. The shoe according to claim 1, wherein the chassis includes a puncture-resistant insole engaged to the toe cap and heel counter.

6. The shoe according to claim 1, wherein the one or more components of the chassis are adhered to the at least one recessed area.

7. The shoe according to claim 1, wherein the one or more components are arranged in the at least one recessed area so that a dimensional interference therebetween securely retains the one or more components within the recessed area.

8. The shoe according to claim 1, wherein the shell is impermeable to water or other liquids.

9. The shoe according to claim 1, wherein the chassis is expandable from a first dimension to a second greater dimension to non-removably lock the chassis in place within the shell.

10. The shoe according to claim 1, wherein the one or more components of the chassis are selected from the group consisting of a toe cap that occupies a toe section of the shell, the toe cap being composed of a rigid, hard material configured to protect a user's toes from injury, a metatarsal guard occupying a metatarsal region of the shell that is adapted to protect a user's foot from injury, and a puncture-resistant sole.

11. A shoe comprising:

a shoe-shaped shell having an inner cavity defined by an inner wall surface of the shell; wherein the shell includes at least one recessed area having a wall portion offset from and contiguous with the inner wall surface of the shell; wherein the at least one recessed area includes a set of stop surfaces arranged at an angle to the inner wall surface of the shell, and the one or more components include corresponding stop surfaces adapted to engage with the stop surfaces of the shell to retain the component within the recessed area; and a chassis having one or more components adapted to protect a user's foot from injury, wherein the chassis includes a toe cap, a heel counter, and an insole board engaged to the toe cap and heel counter, the toe cap occupying a toe section of the shell and being composed of a rigid, hard material configured to protect a user's toes from injury, and wherein the one or more components comprise the toe cap and heel counter, the chassis establishing a press-fit engagement with the shell within the cavity, such that the one or more components of the chassis are non-removably secured within the cavity.

12. The shoe according to claim 11, wherein the shell is impermeable to water or other liquids.

13. The shoe according to claim 11, wherein the chassis is expandable from a first dimension to a second greater dimension to non-removably lock the chassis in place within the shell.

14. The shoe according to claim 11, wherein the chassis includes a metatarsal guard adapted to be positioned over a user's metatarsal region to protect the user's metatarsal region from injury.

15. The shoe according to claim 11, wherein the one or more components of the chassis are adhered to the shell via an adhesive.

16. The shoe according to claim 11, wherein the one or more components of the chassis are selected from the group consisting of a toe cap that occupies a toe section of the shell arranged to overlie a user's toes, the toe cap being composed of a rigid, hard material configured to protect the user's toes from injury, a metatarsal guard occupying a metatarsal region of the shell that is adapted to protect a user's foot from injury, and a puncture-resistant sole.

* * * * *